(12) United States Patent
Kang et al.

(10) Patent No.: US 10,020,497 B2
(45) Date of Patent: Jul. 10, 2018

(54) LITHIUM SECONDARY BATTERY HAVING IMPROVED ELECTROCHEMICAL PROPERTIES, AND METHOD FOR MANUFACTURING SAME

(71) Applicant: DONGGUK UNIVERSITY INDUSTRY—ACADEMIC COOPERATION FOUNDATION, Seoul (KR)

(72) Inventors: Yong-Mook Kang, Seoul (KR); Young-Min Lee, Incheon (KR); Kyeong-Se Song, Ansan-si (KR)

( * ) Notice: Subject to any disclaimer, the term of this patent is extended or adjusted under 35 U.S.C. 154(b) by 0 days.

(21) Appl. No.: 14/418,434

(22) PCT Filed: Sep. 17, 2013

(86) PCT No.: PCT/KR2013/008392
§ 371 (c)(1),
(2) Date: Jan. 29, 2015

(87) PCT Pub. No.: WO2014/042485
PCT Pub. Date: Mar. 20, 2014

(65) Prior Publication Data
US 2015/0188126 A1 Jul. 2, 2015

(30) Foreign Application Priority Data

Sep. 17, 2012 (KR) .................. 10-2012-0102740

(51) Int. Cl.
*H01M 4/134* (2010.01)
*H01M 4/36* (2006.01)
(Continued)

(52) U.S. Cl.
CPC ............. *H01M 4/366* (2013.01); *H01M 4/02* (2013.01); *H01M 4/0419* (2013.01);
(Continued)

(58) Field of Classification Search
CPC .... H01M 4/366; H01M 4/622; H01M 4/0471; H01M 4/623; H01M 4/0419;
(Continued)

(56) References Cited

U.S. PATENT DOCUMENTS

| 2006/0147797 | A1 | 7/2006 | Wu et al. | |
|---|---|---|---|---|
| 2011/0159368 | A1* | 6/2011 | Hirose | H01M 4/134 429/219 |

FOREIGN PATENT DOCUMENTS

| KR | 10-059596 | 8/1992 |
|---|---|---|
| KR | 10-2010-0063747 | 6/2010 |

(Continued)

OTHER PUBLICATIONS

English translation of 10-059596.
(Continued)

*Primary Examiner* — Cynthia K Walls
(74) *Attorney, Agent, or Firm* — Antonio Ha & U.S. Patent, LLC

(57) ABSTRACT

A lithium secondary battery comprising a positive electrode, a negative electrode, a separation film, and an electrolyte, wherein the negative electrode includes a silicon-carbon composite as a negative active material, and wherein the electrolyte includes an additive selected from the group consisting of FEC, VEC, VC, EC, DFEC, t-butylbenzene, and t-pentylbenzene.

8 Claims, 3 Drawing Sheets

(51) Int. Cl.
*H01M 10/052* (2010.01)
*H01M 10/0567* (2010.01)
*H01M 4/38* (2006.01)
*H01M 4/587* (2010.01)
*H01M 4/02* (2006.01)
*H01M 4/04* (2006.01)
*H01M 4/133* (2010.01)
*H01M 4/583* (2010.01)
*H01M 4/62* (2006.01)

(52) U.S. Cl.
CPC ....... *H01M 4/0438* (2013.01); *H01M 4/0471* (2013.01); *H01M 4/133* (2013.01); *H01M 4/134* (2013.01); *H01M 4/364* (2013.01); *H01M 4/386* (2013.01); *H01M 4/583* (2013.01); *H01M 4/587* (2013.01); *H01M 4/622* (2013.01); *H01M 4/623* (2013.01); *H01M 10/052* (2013.01); *H01M 10/0567* (2013.01); *H01M 2004/025* (2013.01); *H01M 2004/027* (2013.01); *Y02T 10/7011* (2013.01)

(58) Field of Classification Search
CPC ........ H01M 4/583; H01M 4/134; H01M 4/02; H01M 4/0438; H01M 4/133; H01M 4/386; H01M 4/587; H01M 4/364; H01M 10/0567; H01M 10/052; Y02P 70/54
See application file for complete search history.

(56) References Cited

FOREIGN PATENT DOCUMENTS

| KR | 10-1042009 | 6/2011 |
|---|---|---|
| KR | 10-2012-0100868 | 9/2012 |

OTHER PUBLICATIONS

English translation of 10-1042009.
English translation of 10-2012-0100868.
English translation of 10-2010-0063747.
C. H. Chen et al. "A novel carbon-silicon composite nanofiber prepared via electrospinning as anode material for high energy-density lithium ion batteries" Journal of Power Sources, vol. 195, pp. 5552-5056 (Feb. 23, 2010).

* cited by examiner

LITHIUM SECONDARY BATTERY HAVING IMPROVED ELECTROCHEMICAL PROPERTIES, AND METHOD FOR MANUFACTURING SAME

TECHNICAL FIELD

The present invention relates to a lithium secondary battery with enhanced electrochemical characteristics and a method for manufacturing the same. More specifically, the present invention relates to a lithium secondary battery having a negative electrode, which is applied with a silicon-carbon composite that has good ionic conductivity and electrical conductivity to be able to maintain a high capacity, and an electrolyte that may improve the electrochemical characteristics of the negative electrode and a method for manufacturing the same.

DISCUSSION OF RELATED ART

Diverse types of second batteries are flourishing in battery-application industries, such as micro batteries for use in human bodies, mid-sized batteries for hybrid vehicles (HEV/PHEV) or electric cars, and large-scale batteries for energy storage in power stations. To that end, high-performance active materials are being developed.

A secondary battery system is recharged/discharged as electrons and ions travel through an electrolyte, and thus requires a high-performance electrolyte.

Existing carbon-based active materials, despite their good characteristics in several aspects, would not be a good choice for future applications requiring higher energy density due to their theoretical capacity limit to 372 mAh/g.

Noncarbon-based negative electrodes have been steadily developed to address the above issue. Among others, silicon (Si) attracts attention with a high discharge of 4,200 mAh/g and a very low lithium reaction potential of 0.4V (Li/Li+). However, silicon-based negative electrodes may be volume-expanded during recharge, causing a short circuit and creating surfaces that may prompt decomposition of the electrolyte. Accordingly, the life characteristic of battery may be drastically deteriorated. Solutions to this are typically branched into reducing Si-based negative electrode materials into nano sizes and adopting an inactive matrix that may suppress volume expansion.

The inventors have been in research for developing lithium secondary batteries with better electrochemical characteristics while addressing the above issues, and came up with the instant invention.

PRIOR ART DOCUMENTS

[Patent Documents]
(Patent Document 1) Korean Patent No. 059596
(Patent Document 2) Korean Patent No. 1042009

SUMMARY

To address the above issues of the prior art, according to the present invention, there is provided a lithium secondary battery and method for manufacturing the same, in which the lithium secondary battery with a unique silicon-carbon structure provides increased ionic and electrical conductivity and reduced volume expansion on recharge/discharge while maintaining a high capacity, along with enhanced electrochemical characteristics including Coulombic efficiency, capacity, and rate performance.

To achieve the above objects, according to the present invention, a lithium secondary battery comprises a positive electrode, a negative electrode, a separation film, and an electrolyte. The negative electrode includes a silicon-carbon composite as a negative active material. The electrolyte includes an additive, such as FEC, VEC, VC, EC, DFEC, t-butylbenzene, and t-pentylbenzene.

Silicon particles are dispersed between the carbon nano-fibers.

A content of the silicon particles is preferably in a range from 3 volume % to 40 volume %. However, the present invention is not limited thereto.

The content of the amorphous silica relative to the overall weight of the silicon particles and the amorphous silica is preferably 0.1 weight % to 25 weight %. However, the present invention is not limited thereto.

A silicon-carbon composite for a negative active material of a lithium secondary battery may be obtained by producing a one-dimensional composite by performing electrospinning on a mixed solution of a high-molecular material and silicon particles and performing heat treatment on the one-dimensional composite.

The high-molecular material may be any one or more selected from the group consisting of polyacrylonitrile (PAN), polyvinylalcohol (PVA), polyvinylpyrrolidone (PVP), polyethylene oxide (PEO), Polyvinylidene Fluoride (PVDF), polymethyl methacrylate (PMMA), polyacrylic acid, and polyurethane.

The electrospinning is preferably performed at a humidity of 36% or less and at a temperature of 34° C. or less.

The electrospinning is preferably performed using a 17-25 gauge nozzle applied with a voltage of 0.5 kV/cm to 3.0 kV/cm.

The heat treatment preferably includes first heat treatment that is performed at a temperature of 230° C. to 350° C. for one hour to ten hours and second heat treatment that, after the first heat treatment, is performed at a temperature of 500° C. to 900° C. for one hour to seven hours.

The second heat treatment is preferably performed in an atmosphere of a mixed gas of an inert gas and a reducing gas.

According to the present invention, the lithium secondary battery uses an electrolyte that is produced by mixing the lithium salt and the organic solvent in an atmosphere of an inert gas and adding and mixing an additive, such as fluoroethylene carbonate (FEC, vinyl ethylene carbonate (VEC), vinylene carbonate (VC), ethylene carbonate (EC), difluoroethylene carbonate (DFEC), t-buthylbenzene, or t-phentylbenzene, to the mixed solution in an atmosphere of an inert gas.

The lithium salt may include LiPF6 or LiBF6. The organic solvent may include PC (propylene carbonate), EC (ethylene carbonate), DMC (dimethylene carbonate), DEC (diethylene carbonate), or a combination thereof.

The inert gas used may include helium (He), nitrogen ($N_2$), argon (Ar), or xenon (Xe).

Further, according to the present invention, there are provided an electronic device or vehicle including a lithium secondary battery according to the present invention.

According to the present invention, a lithium secondary battery uses a silicon-carbon composite as a negative active material, wherein silicon and carbon fibers are combined, and the surface of silicon particles is coated with amorphous silica, thus reducing volume expansion upon insertion of lithium ions while remaining at a high capacity with excellent ionic and electrical conductivity.

Further, According to the present invention, a lithium secondary battery may enhance its electrochemical characteristics such as Coulombic efficiency, capacity, and rate performance by using an additive, such as FEC, VEC, VC, EC, DFEC, t-butylbenzene, and t-pentylbenzene.

DESCRIPTION OF EXEMPLARY EMBODIMENTS

Figure 1:
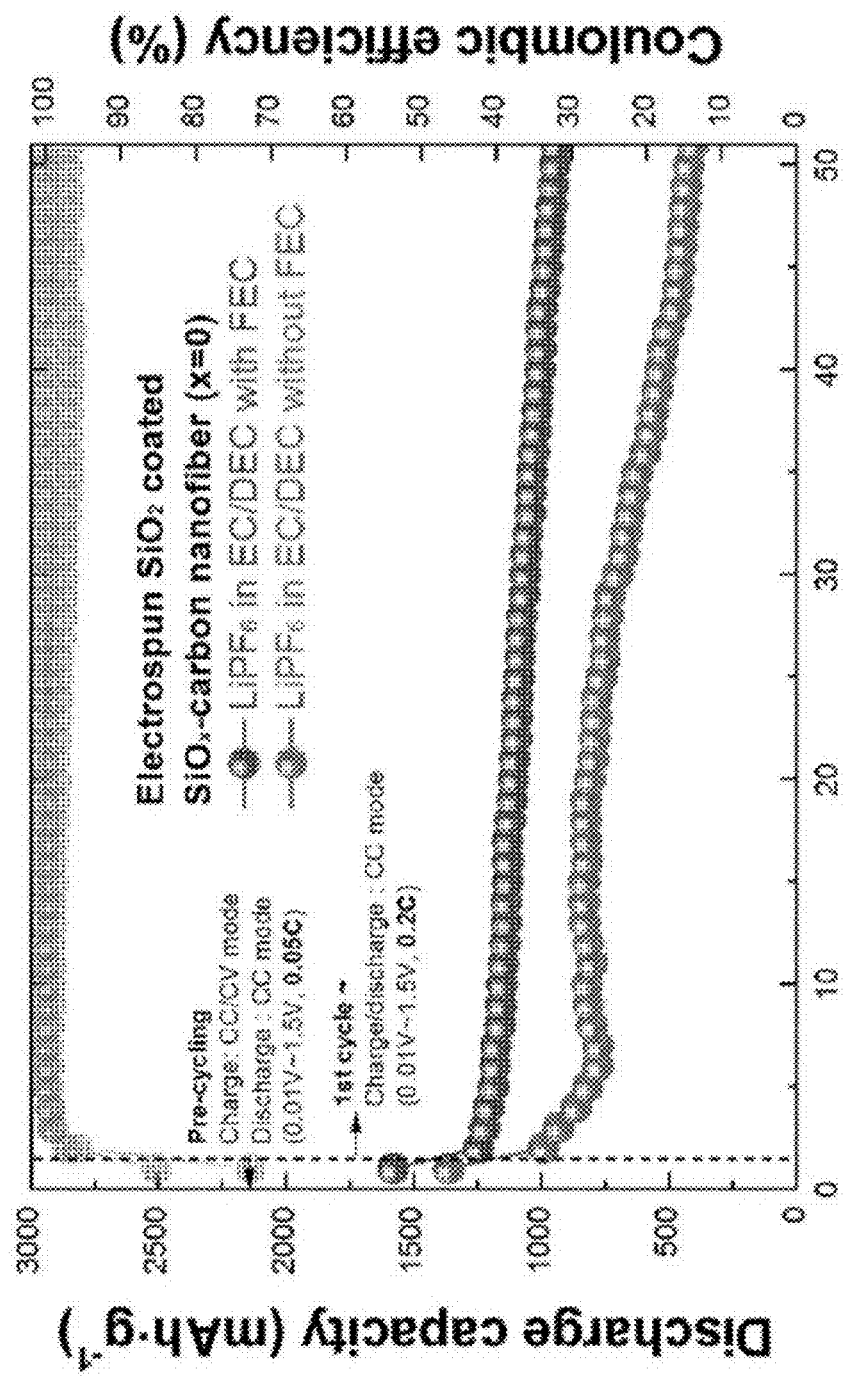
FIG. 1 is a graph illustrating a comparison in life property of a silicon-carbon composite between when a no FEC electrolyte is used and when an FEC electrolyte is used, according to the present invention.

Hereinafter, the present invention is described in detail.

A lithium secondary battery includes a positive electrode, a negative electrode, a separation film, and an electrolyte.

According to the present invention, the negative electrode of the lithium secondary battery includes a silicon-carbon composite as a negative active material.

According to the present invention, the silicon-carbon composite includes carbon nano-fibers and silicon particles. The silicon particles are coated with amorphous silica ($SiO_2$). According to the present invention, the silicon particles coated with amorphous silica in the silicon-carbon composite are dispersed in the carbon nano-fibers.

According to the present invention, the silicon-carbon composite is a fiber-type mixture having a one-dimensional structure, and the silicon-carbon composite is a composite of carbon and silicon coated with amorphous silica. The silicon-carbon composite includes carbon, and thus the silicon-carbon composite may have a relatively higher electric conductivity and lithium ionic conductivity as compared with silicon. The carbon and amorphous silica coated on the silicon particles may reduce a volume expansion that may occur when lithium ions are inserted.

The content of the silicon particles in the silicon-carbon composite is preferably in a range from 3 volume % to 60 volume %. When the content of silicon particles is more than 60 volume % the carbon nano-fibers might not properly surround the silicon particles, rendering it difficult to sufficiently suppress volume expansion. The content of silicon particles being less than 3 volume % may result in too low energy density due to the reduction in the amount of silicon, a major active material that is to be alloyed with lithium.

The content of amorphous silica relative to the overall weight of the silicon particles and the amorphous silica is preferably in a range from 0.1 weight % to 25 weight %. When the content of amorphous silica is more than 25 weight %, the volume expansion of silicon, as a major active material in the silicon-carbon composite, may be left more controllable, but energy density may be excessively reduced. When the content of amorphous silica is less than 0.1 weight %, the volume expansion of silicon might not be effectively controlled.

A method for manufacturing a silicon-carbon composite According to the present invention is now described.

According to the present invention, a silicon-carbon composite as a negative active material of a lithium secondary battery may be obtained by preparing a composite of a one-dimensional structure by electrospinning a mixed solution including a polymer and silicon particles, followed by performing heat treatment on the one-dimensional composite.

The polymer may be a precursor providing carbon in the silicon-carbon composite. Any material that may provide carbon by carbonization may be used as the polymer. For example, the polymer includes polyacrylonitrile, polyvinyl alcohol, polyvinyl pyrrolidone, polyethylene oxide, polyvinylidene fluoride, polymethyl methacrylate, polyacrylic acid, or polyurethane. Preferably, polyacrylonitril is used as the polymer. Solvents that may dissolve the polymer are limited depending on the unique characteristics of the polymer, such as whether the polymer is hydrophilic or hydrophobic, and matching the polymer with a proper solvent is preferable.

Upon preparation of the mixed solution, the content of the polymer is preferably 3 weight parts to 20 weight parts relative to 100 weight parts of the solvent. When the content of the polymer is less than 3 weight parts, clots (also referred to as "beads") may be created in the structure due to low viscosity when the electrospinning is performed, thus leading the fibers to an uneven thickness. When the content of the polymer is more than 20 weight parts, the silicon particles may be agglomerated. Therefore, the carbon might not properly control volume expansion of silicon particles, and the polymer may be partially clotted into beads.

The solvent for producing the mixed solution may include, but not limited to, ethanol, methanol, propanol, puthanol, isopropyl alcohol (IPA), dimethylformamide (DMF), acetone, tetrahydrofuran (THF), toluene, dimethylacetamide (DMAC), or distilled water ($H_2O$). The solvent may have a boiling point of about 120° C. Selection of a solvent to be used may depend on whether the polymer is hydrophilic or hydrophobic. For example, when the polymer is hydrophilic, an organic solvent or distilled water ($H_2O$) may be used as the solvent. Among the solvents, when polyacrylonitrile is used as the polymer, dimethylformamide is preferably used as the solvent.

The mixed solution may be stirred at 25° C. to 80° C. into a homogeneous solution. Solubility of the polymer in the solvent may depend on the properties of the polymer and temperature. Unless the polymer is dissolved in the solvent at a proper temperature, the obtained fibers might not be in uniform structure, and the electrospinning might not be continuously conducted. In particular, when the polymer is poly acrylonitrile, and the solvent is dimethylformamide, it is most preferable to dissolve the polymer in the solvent at about 60° C.

The content of the silicon particles is preferably 5 weight parts to 30 weight parts relative to 100 weight parts of the polymer. When the content of the silicon particles is less than 5 weight parts, the energy density of an electrode to be obtained may be reduced due to the reduced amount of silicon. When the content of the silicon particles is more than 30 weight parts upon preparation of a silicon-carbon composite having silicon particles surface-coated with amorphous silica ($SiO_2$), the silicon particles may be agglomerated by high surface energy, thus creating secondary phases at many portions. Accordingly, carbon generated when the polymer is carbonized cannot be evenly distributed, inhibiting effective volume expansion.

The one-dimensional structure of composite is obtained by electrospinning the mixed solution. For example, a typical electrospinning apparatus may be used for electrospinning. For example, the electrospinning apparatus may include a supplier for supplying a solution, a nozzle for jetting the supplied solution, a collector for collecting fibers jetted from the nozzle, and a voltage generator for applying a voltage to the nozzle and the collector.

According to the present invention, the mixed solution containing the solvent, the polymer, and the silicon particles are supplied to the electrospinning apparatus through the supplier. The mixed solution is jetted through the nozzle that is applied with a positive voltage by the voltage generator, and the jetted resultant material is collected to the collector charged with a relatively negative voltage.

Upon electrospinning, the solvent is vaporized by the positive voltage and the polymer chains of the polymer is stretched while the polymer surrounds the silicon particles, leaving an elongated, one-dimensional fiber structure. The jetted fiber structure is collected by the collector charged with relatively negative electric charges. Upon electrospinning, the positive and negative voltages vary depending on the polymer and the solvent.

Upon electrospinning, the thickness and quality of the fibers obtained are determined by voltage applied per distance (unit: e.g., kV/cm), amount of solution injected (unit: e.g., ml/min, ml/h, or l/h), and/or the nozzle or needed used. Upon electrospinning, the positive voltage applied is adjusted by the nature of the polymer and the distance between the collector and the nozzle. For example, as the mixed solution is jetted more quickly, a higher positive voltage is required. The amount of fibers obtained may be adjusted depending on times. The nozzle may have various sizes that are, e.g., in a range from 15 gauge (inner diameter: about 1.4 mm) to 32 gauge (inner diameter: about 0.1 mm). The size of the nozzle used is determined depending on the type of the polymer used. A 17-gauge nozzle (inner diameter: about 1.05 mm) through a 25-gauge nozzle (inner diameter: about 0.25 mm) are appropriate as the nozzle. The homogeneity and thickness of fibers obtained are determined by the size of the nozzle selected.

The one-dimensional composite structure, which has been obtained by electrospinning, undergoes a heat treatment process to partially oxidize the silicon particles while carbonizing the polymer, forming a composite of carbon and silicon ($SiO_x$, $0 \leq x \leq 2$) surface-coated with amorphous silica ($SiO_2$).

Preferably, the heat treatment process includes first heat treatment that is performed at a temperature of 230° C. to 300° C. for one hour to ten hours in an atmosphere of air and second heat treatment that, after the first heat treatment, is performed at a temperature of 500° C. to 900° C. for one hour to seven hours in an atmosphere of a mixed gas of an inert gas and a reducing gas. More preferably, the mixed solution is heat-treated for seven hours at 230° C. and is then heat-treated for one hour at 700° C.

When the temperature of the first heat treatment is less than 230° C. the solvent, or water where the polymer and silicon particles are dissolved might not be sufficiently vaporized, thus rendering it difficult to obtain the resultant product in a power type after the heat treatment or putting the resultant product in an unstable structure upon the second heat treatment. When the temperature of the first heat treatment is more than 350° C., partial carbonization may proceed prior to the vaporization of the solvent and water, causing a failure to formation of a desired structure. Further, the temperature of the second heat treatment being less than 500° C. may lead to insufficient carbonization of the polymer. The temperature of the second heat treatment being more than 900° C. may result in excessive oxidation of the silicon particles, significantly reducing the amount of silicon that has high electrochemical energy density.

The inert gas used may include helium (He), nitrogen ($N_2$) argon (Ar), neon (Ne), or xenon (Xe). The reducing gas used may include hydrogen ($H_2$).

Without using the inert gas, carbon might be vaporized upon carbonization of the polymer, and thus, the resultant structure might not be supported. Further, the presence of a large amount of amorphous silica ($SiO_2$), without carbon, on the surface of the structure may render it difficult to achieve a proper electrochemical reaction.

A polymer-silicon composite of a one-dimensional fiber structure may be obtained through thermal decomposition of the polymer and evaporation of the solvent, which are carried out by the first heat treatment. The polymer-silicon composite may be subjected to the second heat treatment to partially oxidize the silicon particles and to carbonize the polymer without affecting the structural and physical property thereof, thus forming a one-dimensional silicon-carbon composite having the silicon particles surface-coated with amorphous silica ($SiO_2$).

According to the present invention, the separation film used may include, but not limited to, a polyethylene or polypropylene microporous membrane.

According to the present invention, the term "electrolyte" as used herein refers to a material in which a solute, an ion source, is dissolved in an organic solvent. According to the present invention, the electrolyte for a lithium secondary battery may differ in concept from the conventional electrolytes in that the electrolyte for a lithium secondary battery enables lithium ions to be smoothed and widened.

According to the present invention, the electrolyte includes a mixed solution of a lithium salt and an organic solvent and an additive including, but not limited to, FEC, VEC, VC, EC, DFEC, t-buthylbenzene, or t-phentylbenzene.

According to the present invention, use of the electrolyte may enhance the surface properties of silicon in the silicon-carbon composite, a negative active material, thus preventing an attack from a by-product, such as $PF_6$, which is generated upon recharge. Therefore, the electrochemical properties, such as Coulombic efficiency, rate performance, and life property, may be overall enhanced.

According to the present invention, the lithium salt in the electrolyte may include, but not limited to, $LiPF_6$ or $LiBF_6$, and the organic solvent in the electrolyte may include, but not limited to, PC (propylene carbonate), EC(ethylene carbonate), DMC(dimethylene carbonate), DEC(diethylene carbonate), or a mixed solution thereof.

According to the present invention, the electrolyte ma be prepared by mixing the lithium salt and the organic solvent in an atmosphere of an inert gas and adding and by adding an additive, such as FEC, VEC, VC, EC, DFEC, t-buthylbenzene, or t-phentylbenzene, to the mixed solution in an atmosphere of an inert gas.

The inert gas used may include, but limited to, helium (He), nitrogen ($N_2$), argon (Ar), or xenon (Xe).

According to the present invention, the additive is added to the mixed solution preferably by 0.1 weight % to 30 weight % relative to the overall weight of the electrolyte, but the present invention is not limited thereto.

Hereinafter, preferred embodiments are described for a better understanding of the present invention, but the embodiments are mere examples, and it should be appreciated by those skilled in the art that various modifications and changes may be made thereto without departing from the scope of the present invention, and such modifications and changes also belong to the scope of the present invention defined by the claims.

Embodiment 1. Preparation of a Silicon Oxide-Carbon Composite and an Electrolyte Appropriate for the Same (1) Preparation of a Silicon-Carbon Composite Coated with Amorphous Silica ($SiO_2$)

First, polyacrylonitrile and dimethalformamide whose weight ratio was 11:89 were heated to melt at 60° C., and were then added with a silicon powder in a ratio of 2:8 relative to the polyacrylonitrile, and the resultant solution was stirred, forming a homogeneous mixed solution.

The prepared mixed solution was electrospun into a fiber-type composite of a one-dimensional structure. For example, the mixed solution was supplied to the supplier of the electrospinning apparatus, was jetted into fibers from the supplier through the nozzle, applied with a positive voltage of 0.7 kV/cm or more. The jetted fibers were collected by the collector charged with a relatively negative voltage, obtaining a one-dimensional fiber-type composite.

The obtained fiber-type composite was heat-treated at 280° C. for five hours in an atmosphere of air (first heat treatment), and was then heat-treated at 700° C. for one hour in an atmosphere of a mixed gas (e.g., $Ar/H_2$ 5%) of an inert gas (e.g., argon) and a reducing gas (e.g., hydrogen) (second heat treatment), thus obtaining a one-dimensional silicon-carbon composite coated with amorphous silica ($SiO_2$).

(2) Preparation of Electrolyte

A lithium salt, e.g., $LiPF_6$, was mixed with an organic solvent that is an EC and DEC mix (the volume ratio of EC to DEC was 1:1) in an atmosphere of Ar, thus obtaining a mixed solution (which may be a typical type of electrolyte). Thereafter, the obtained mixed solution was mixed with a predetermined amount FEC additive in an atmosphere of Ar, thus obtaining a $LiPF_6$-mixed EC/DEC (1:1, v/v).

Experimental Example 1. Comparison in Life Property of Silicon-Carbon Composite Between when FEC-Added Electrolyte is Used and when No FEC Electrolyte Comparison in life property of a silicon-carbon composite prepared According to the present invention as made between when an LiPF6-mixed EC/DEC (1:1, v/v) electrolyte ran containing FEC (shortly referred to herein as "no FEC electrolyte") was used when and an LIPF6-mixed EC/DEC (1:1, v/v) electrolyte containing FEC (shortly referred to herein as "FEC-added electrolyte") was used. An analysis result is shown in FIG. 1.

As evident from FIG. 1, when the no FEC electrolyte was used, the silicon-carbon composite showed a significantly reduced life property after the twentieth discharge, and the fiftieth discharge, the silicon-carbon composite showed a capacity reduced by about 50% as compared with the capacity at the first discharge. In contrast, when the FEC-added electrolyte prepared according to an embodiment was used, the silicon-carbon composite showed a relatively constant discharge capacity without a remarkable decrease in discharge capacity as compared with the capacity at the first discharge. When the no FEC electrolyte was used, the silicon-carbon composite showed an average Coulombic efficiency of 98% while, when the FEC-added electrolyte was used, the silicon-carbon composite exhibited a high average Coulombic efficiency of 99.8%, enabling most of the alloyed lithium to be disrobed upon discharge.

Experimental Example 2. Comparison in Capacity Retention of Silicon-Carbon Composite and Silicon Between when FEC-Added Electrolyte is Used and when No FEC Electrolyte is Used Comparison in capacity retention of silicon and a silicon-carbon composite prepared According to the present invention was made between an LiPF6-mixed EC/DEC (1:1, v/v) electrolyte not containing FEC (shortly referred to herein as "no FEC electrolyte") was used and when an LIPF6-mixed EC/DEC (1:1 v/v) electrolyte containing FEC (shortly referred to herein as "FEC-added electrolyte") was used. An analysis result is shown in FIG. 2.

Figure 2:
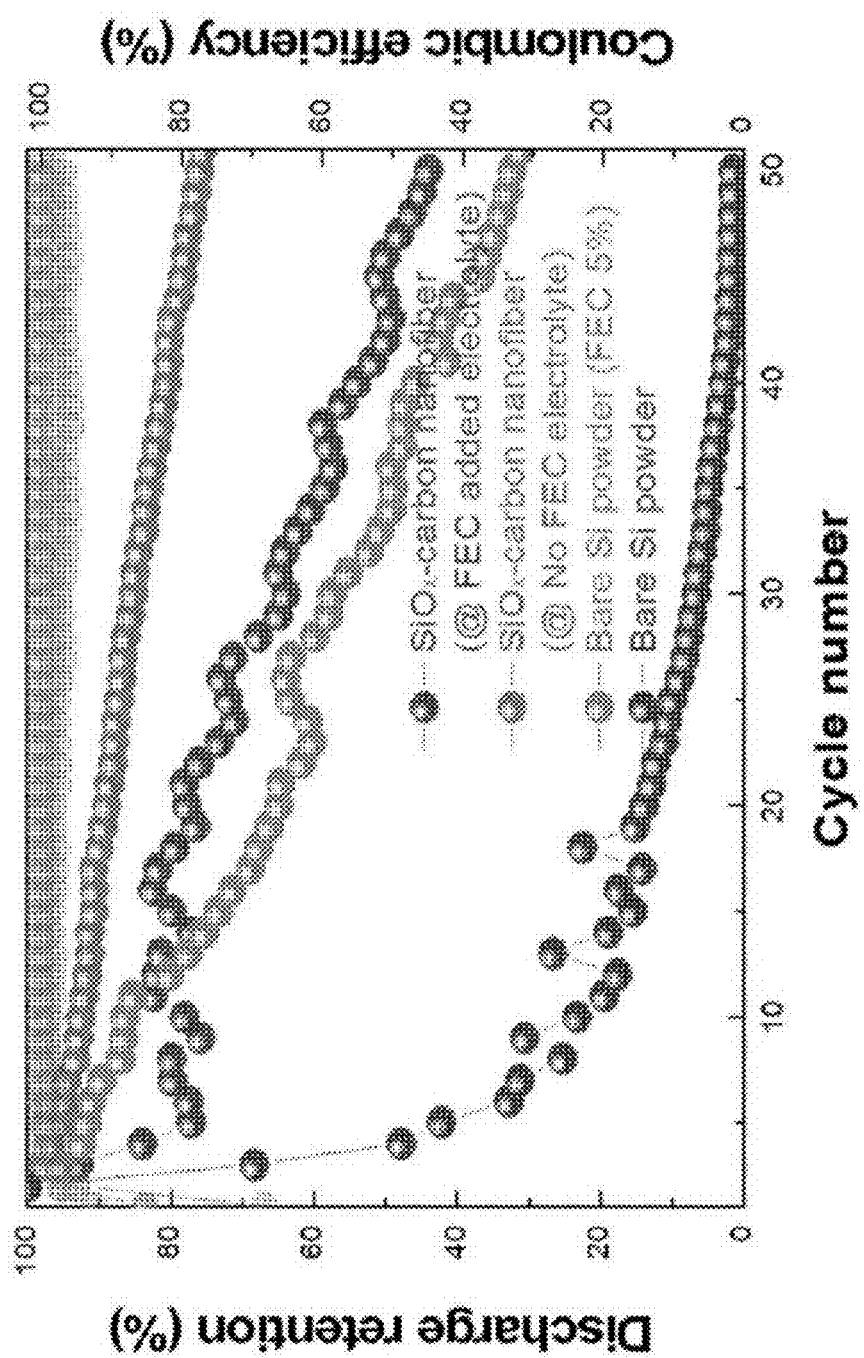
FIG. 2 is a graph illustrating a comparison in capacity retention of a silicon-carbon composite and silicon between when a no FEC electrolyte is used and when an FEC electrolyte is used, according to an embodiment of the inventive concept.

As evident from FIG. 2, as recharge and discharge are repeated fifty times, when the FEC-added electrolyte was used, the silicon-carbon composite was maintained at a discharge capacity of about 80% while, when the no-FEC electrolyte was used, the silicon-carbon composite was maintained at a discharge capacity at about 50%. Such enhancement in capacity retention may be attributed to suppression of a reaction between the decomposed electrolyte by-product and the silicon oxide that might not be completely surrounded by carbon, which may come from enhanced surface characteristics achieved by the FEC. Even when the silicon-carbon composite was replaced with silicon, the FEC-added electrolyte enabled a noticeably increased life property as compared with the no FEC electrolyte. For example, when the no FEC electrolyte was used, the silicon electrode showed little capacity retention as recharge and discharge were continuously conducted forty times while, when the FEC-added electrolyte was used, the silicon electrode showed a capacity retention of about 30% even after recharge and discharge had been done fifty times.

Experimental Example 3. Comparison in Rate Performance of Silicon-Carbon Composite Between when FEC-Added Electrolyte is Used and when FEC-Added Electrolyte is Used Comparison in rate performance of a silicon-carbon composite prepared According to the present invention was made between when an LiPF6-mixed EC/DEC (1:1, v/v) electrolyte not containing FEC (simply referred to herein as "no FEC electrolyte") was used and when an LIPF6-mixed EC/DEC (1:1, v/v) electrolyte containing FEC (simply referred to herein as "FEC-added electrolyte") was used. An analysis result is shown in FIG. 3.

Figure 3:
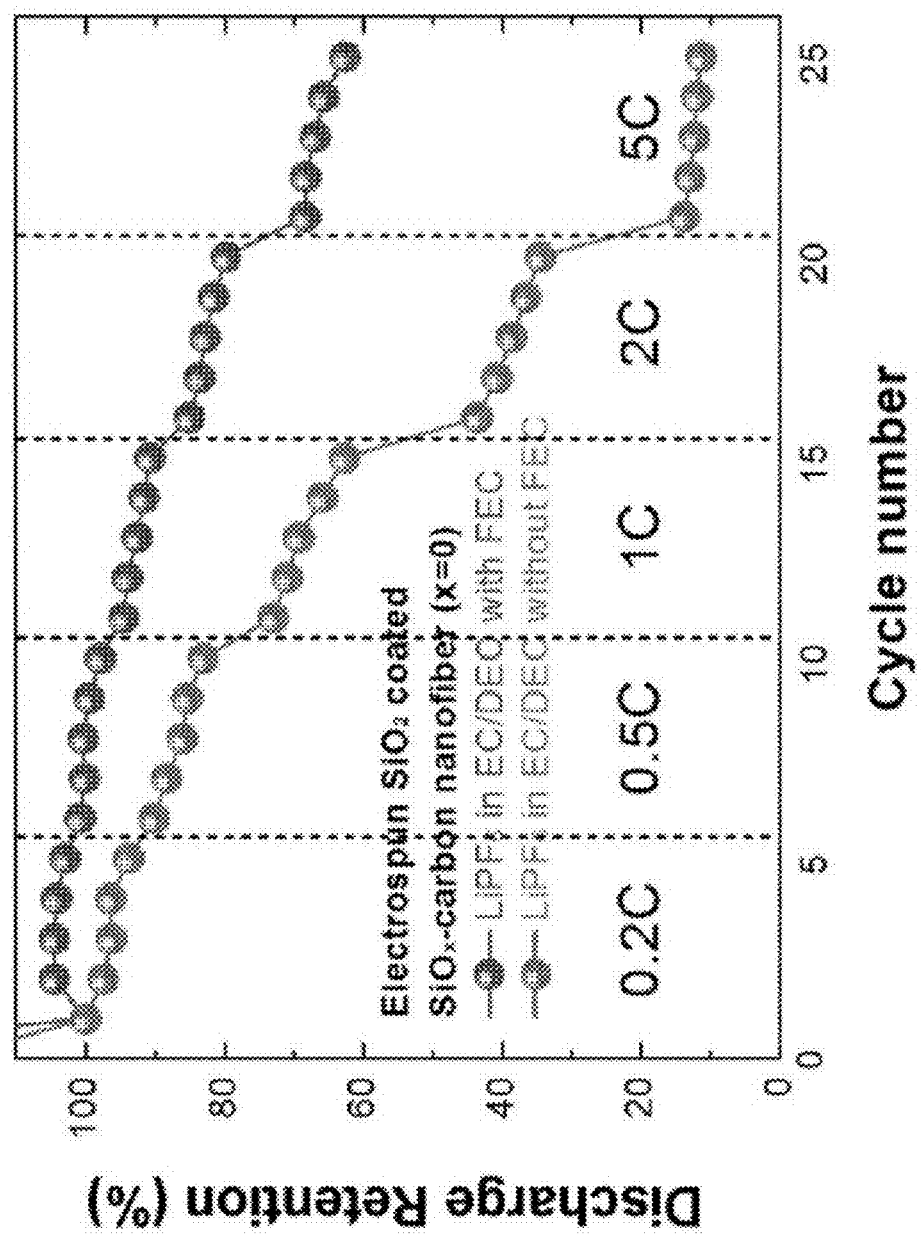
FIG. 3 is a graph illustrating a comparison in rate performance of a silicon-carbon composite between when a no FEC electrolyte is used and when an FEC electrolyte is used, according to the present invention.

As evident from FIG. 3, when the no FEC electrolyte was in use, the rate performance of the silicon-carbon composite was decreased to about 10% in 5 C. In contrast, the silicon-carbon composite showed a high rate performance of 60% or more even in 5 C when the FEC-added electrolyte was used.

As apparent from the above results, the FEC-added electrolyte may make better the overall electrochemical performance including Coulombic efficiency, capacity, and rate performance as well as life property of the silicon-carbon composite by enhancing the surface characteristics of silicon.

What is claimed is:
1. A lithium secondary battery comprising a positive electrode, a negative electrode, a separation film, and an electrolyte, wherein the negative electrode includes a silicon-carbon composite as a negative active material, wherein the electrolyte is obtained by adding fluoroethylene carbonate (FEC) and any one selected from the group consisting of vinyl ethylene carbonate (VEC), vinylene carbonate (VC), ethylene carbonate (EC), difluoroethylene carbonate (DFEC), t-butylbenzene, and t-pentylbenzene to a mixture of a lithium salt and an organic solvent, wherein the silicon-carbon composite includes carbon nano-fibers and silicon particles, the silicon particles coated with amorphous $SiO_2$, wherein the silicon particles are scattered between the carbon nano-fibers, wherein a content of the silicon particles is in a range from 3 volume % to 40 volume %, wherein a weight ratio of the silicon particles to the amorphous $SiO_2$ is in a range from 1:0.2 to 1:20, wherein the silicon-carbon composite is obtained by producing a one-dimensional composite by performing electrospinning a mixed solution of a polymer and silicon particles and performing heat treatment on the one-dimensional composite, and wherein the polymer includes any one or more selected from the group consisting of polyacrylonitrile (PAN), polyvinylalcohol (PVA), polyvinylpyrrolidone (PVP), polyethylene oxide (PEO), polyvinylidene fluoride (PVDF), polymethyl methacrylate (PMMA), polyacrylic acid, and polyurethane.

2. The lithium secondary battery of claim 1, wherein the electrospinning is performed at a humidity of 36% or less and at a temperature of 34° C. or less.

3. The lithium secondary battery of claim 1, wherein the electrospinning is performed using a 17-25 gauge nozzle applied with a voltage of 0.5 kV/cm to 3.9 kV/cm.

4. The lithium secondary battery of claim 1, wherein the heat treatment includes first heat treatment that is performed at a temperature of 230° C. to 300° C. for one hour to ten hours and second heat treatment that, after the first heat treatment, is performed at a temperature of 500° C. to 900° C. for one hour to seven hours.

5. The lithium secondary battery of claim 4, wherein the second heat treatment is performed in an atmosphere of a mixed gas of an inert gas and a reducing gas.

6. The lithium secondary battery of claim 1, wherein the lithium salt is $LiPF_6$ or $LiBF_6$.

7. The lithium secondary battery of claim 1, wherein the organic solvent includes PC (propylene carbonate), EC (ethylene carbonate), DMC (dimethylene carbonate), DEC (diethylene carbonate), or a mixed solution thereof.

8. An external device including the lithium secondary battery of claim 1.

\* \* \* \* \*